March 28, 1961  J. E. GOLDRING  2,976,844
STROKE ADJUSTMENT FOR DRIVE CYLINDERS AND THE LIKE
Filed Oct. 16, 1959
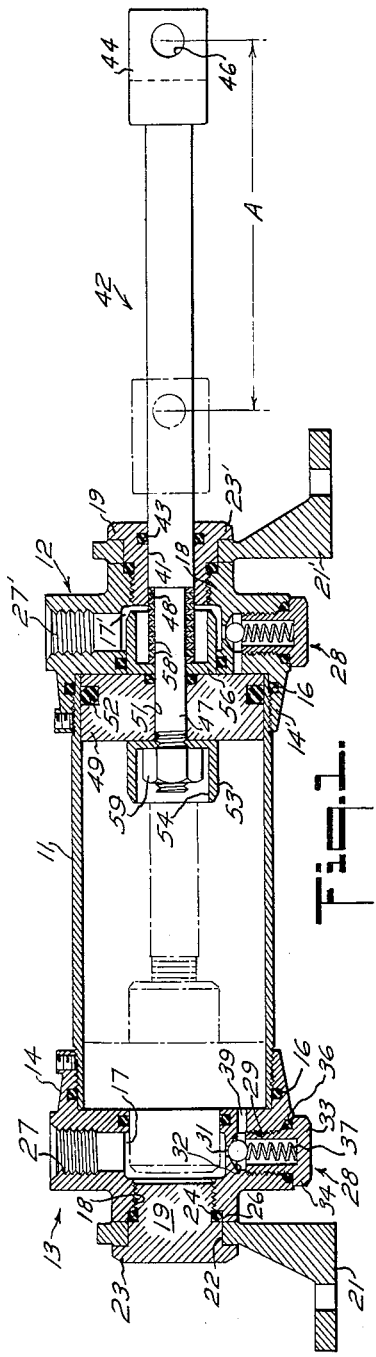
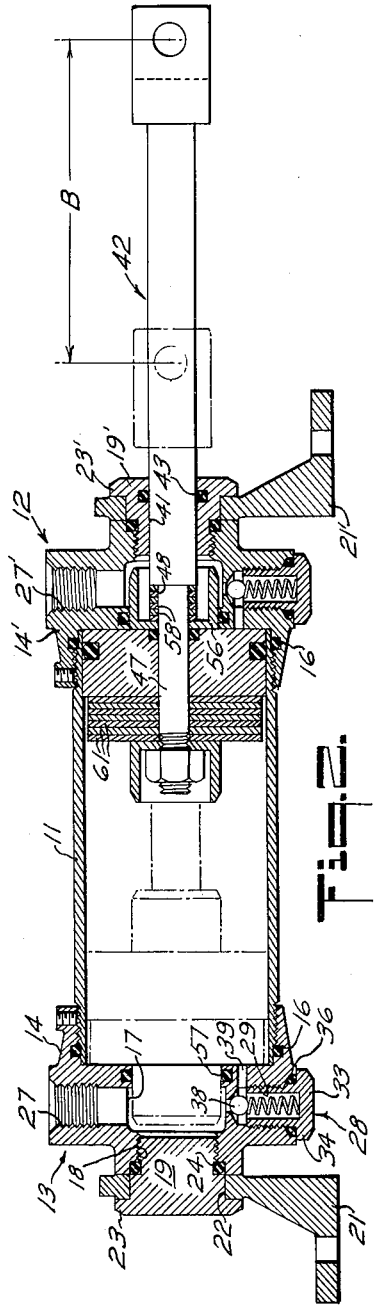
INVENTOR.
JOHN E. GOLDRING
BY
Gardner & Zimmerman
ATTORNEYS

United States Patent Office 2,976,844
Patented Mar. 28, 1961

2,976,844

STROKE ADJUSTMENT FOR DRIVE CYLINDERS AND THE LIKE

John E. Goldring, San Leandro, Calif., assignor to Modernair Corporation, San Leandro, Calif., a corporation of California Filed Oct. 16, 1959, Ser. No. 846,862

7 Claims. (Cl. 121—38)

This invention relates to a piston rod construction for use in fluid powered drive cylinders and related apparatus and more particularly to a piston rod having provision for varying the travel of an associated drive cylinder.

Fluid powered drive cylinders are extensively used in a variety of mechanisms to impart a controlled reciprocating movement to a member. Such cylinders are basically comprised of a cylindrical barrel, a piston slidably disposed therein, a piston rod extending through a seal at one end of the barrel and connecting with the piston therein, and means for admitting high pressure air or hydraulic fluid to either end of the barrel for driving the piston and piston rod in a selected direction. The piston rod is connected, either directly or through a suitable intervening linkage, with the load which is to be driven. Thus in the absence of further provision the distance traveled by the piston rod is fixed by the longitudinal dimension of the barrel, the motion being stopped when the piston contacts either end of the barrel.

The varying usages to which drive cylinders are put require many different stroke lengths. Accordingly it has been the practice to manufacture cylinders of a given diameter in various lengths so that a purchaser may select one particularly suited to the intended application. Production considerations, however, place a limit on the number of size gradations which can be economically manufactured for stock so that in practice a manufacturer will produce a line of cylinders differing in length by some fixed increment such as one inch. In some applications however, particularly where precision mechanisms are involved, it is necessary that the cylinder stroke length be fixed at a non-standard value. Heretofore such cylinders have had to be custom fabricated and have therefore been relatively costly.

A related problem resulting from the manufacture of cylinders with fixed stroke lengths is that a given cylinder cannot be conveniently adjusted with respect to stroke length in instances where changes in the associated mechanism call for such adjustment or where it is desired to salvage the cylinder and utilize it for a second application of differing requirements from the first. While stroke changing mechanisms can be connected between the cylinder and the load in such instances, such mechanisms are a further complication and expense and may be disadvantageous in installations where bulk or weight must be minimized.

Thus it may be seen that considerable advantage is to be gained with a cylinder construction in which the stroke length may be conveniently varied. Provided variation is possible over a range extending at least to the next standard cylinder size, the need for custom fabrication is largely eliminated. In addition the usefulness of a given unit for diverse applications is considerably enhanced.

The present invention provides for adjusting the stroke length of a cylinder by means of a novel piston rod assembly. Specifically the end of the piston rod within the cylinder is formed to be of reduced diameter with respect to the portion of the rod which projects from the end of the cylinder. The piston is coaxially mounted on the reduced end of the piston rod and is of lesser length in the axial direction so that it may be set at any selected longitudinal position on the rod. Two sets of annular thin flat spacers are provided with the cylinder, a first set having a diameter almost equal to that of the piston and a second set having a diameter not exceeding that of the large end of the piston rod. By disposing an appropriate number of the larger spacers on the end of the piston rod, against the piston and in coaxial relationship therewith, the piston can be in effect made longer and the stroke of the drive cylinder will be accordingly reduced a chosen distance. The smaller spacers are utilized to fill so much of the reduced end of the piston rod as is not occupied by the piston and large spacers and the members are rigidly locked in position by threading a nut on the end of the rod, and the excess space along the reduced portion of the rod is completely filled with the small spacers.

The adjustment is thus simple and can be quickly and conveniently made either at the time the cylinder is delivered to the user or at the time of installation. Provided the reduced section of the piston rod is made long enough for reducing the stroke of the cylinder down to the maximum stroke of the next smaller standard size cylinder, the need for custom fabrication of such cylinders is virtually eliminated insofar as stroke travel requirements are concerned. While the addition or removal of spacers to change the stroke length is itself an incremental change determined by the thickness of the spacers, the incremental change can be made very small by the use of suitably thin spacers. By utilizing an appropriate combination of spacers of different thicknesses, virtually any desired change in stroke travel can be effected with sufficient precision.

It is therefore an object of this invention to provide a piston and piston rod assembly for use in fluid powered drive cylinders and related mechanisms which assembly has provision for varying the travel of the piston.

It is an object of this invention to provide means whereby fluid powered drive cylinders produced in a series of standard sizes may be quickly and conveniently adjusted to provide stroke lengths intermediate of said standard sizes.

It is a further object of this invention to provide a fluid drive cylinder construction with which a cylinder designed for one usage may be readily salvaged and employed in a differing application requiring differing stroke travel.

It is another object of this invention to provide an internal adjustment for varying the stroke of a fluid drive cylinder which adjustment does not interfere with stroke cushioning mechanisms, seals, or other elements of the cylinder.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1 is a longitudinal section view of a pneumatic cylinder embodying the invention with the novel stroke adjustment means arranged for maximum travel.

Figure 2 is a longitudinal section view of the pneumatic cylinder shown in Figure 1 with the stroke adjustment means thereof re-arranged to provide for a lessened travel.

Referring now to the drawing, and more particularly to Figure 1 thereof, the drive cylinder is comprised of a cylindrical barrel 11 threaded at each extremity and having a length equal to the maximum desired stroke length. A forward head assembly 12 and rear head assembly 13 serve to close the ends of barrel 11, each such assembly having an internally threaded tubulation 14 and 14′ receiving the corresponding end of the barrel and mounting an O-ring 16 therearound to insure a hermetic seal.

Rear head 13 is provided with a stepped axial passage, the larger and more forward portion of which forms a cushion chamber 17 and the rearward portion 18 of which is threaded to receive a threaded plug 19. An L-bracket 21 is provided to mount the rear portion of the cylinder on a supporting surface, the bracket having an opening 22 in one leg through which plug 19 is transpierced and the plug having a terminal flange 23 which holds the bracket to the head. To seal passage 18, an O-ring 24 is mounted on a shoulder 26 therein. To provide for the connection of the rearward end of the cylinder with a source of driving air, a threaded passage 27 extends outward from cushion chamber 17 in a radial direction.

To transmit air pressure from passage 18 to the rearward end of barrel 11 at such times as the cushioning chamber 17 is effectively closed by a cushioning element, a check valve assembly 28 is provided, the assembly being disposed in a threaded bore 29 which bore is aligned radially with respect to chamber 17 and which is communicated therewith through an aperture 31 in a conical valve seat 32. A threaded hollow cylindrical plug 33 is engaged in the bore 29, such plug having a flange 34 at the outer end and having an O-ring 36 seated against the flange. A compression spring 37 is disposed coaxially within plug 33 and bears against a spherical valve member 38 which seats against aperture 31. A lateral passage 39 connects bore 29 with the rearward end of barrel 11.

The forward head assembly 12 is substantially similar in construction to the rear head 13 and thus is comprised of the threaded tubulation 14′ receiving the forward end of barrel 11 and is provided with a cushion chamber 17′ which is continuous with a more forwardly situated threaded bore 18′ receiving a threaded plug 19′. The plug 19′ differs from that previously described in that it is provided with an axial bore 41, in which an O-ring 43 is mounted, such bore being for the purpose of admitting a drive rod into the cylinder as will hereinafter be described in more detail. Further components of the head assembly 12, all similar to the corresponding elements as previously described with reference to the rear head 13, are a check valve assembly 28′ providing for air flow from chamber 17′ to the forward end of barrel 11, a threaded driving air passage 27′ communicating with chamber 17′, and an L-bracket 21′ secured to the forward end of the head assembly by a flange 23′ on plug 19′ and serving to secure the forward end of the cylinder to a supporting surface.

A cylindrical piston rod 42 is disposed along the axis of the cylinder and extends through bore 41 and chamber 17′ of the forward head 12, the piston rod being slideable in the longitudinal direction. To provide for connection of the piston rod 42 with a load, a coupling 44 having a transverse bore 46 is secured to the forward end of the rod.

The rearward portion 47 of the piston rod 42 is of reduced diameter with respect to the remainder of the rod thus forming a shoulder 48 at an intermediate point thereon. The reduced portion 47 is preferably made as long as is possible subject to the limitation that shoulder 48 must remain rearward from O-ring 43 when the rod 42 is extended to the most forward position thereof. Within barrel 11, an annular piston 49 is mounted coaxially on the reduced portion 47 of the piston rod 42, the piston having a central passage 51 through which the rod extends so that the piston is slidable along the rod except as it may be locked in position as will be described. The piston 49 has a diameter conforming to the interior of the barrel 11 and is provided with a circumferential groove in which an O-ring 52 is disposed so that the piston will be driven in either direction within the barrel by the admission of high pressure air to a selected end thereof.

The cylinder of Figures 1 and 2 is shown with end-of-stroke cushioning means in order to illustrate the relationship of components of the invention therewith, it being understood that the invention is equally applicable to cylinders which are not provided with cushions. Thus in Figure 1 there is shown a rear cushion cylinder 53, having a stepped axial passage 54, disposed coaxially on piston rod 42 immediately to the rear of piston 49. A front cushion cylinder 56, similar to cylinder 53 and facing in the opposite direction, is mounted on the rod 42 immediately forward from the piston 49. The cushion cylinders 53 and 56 enter the cushion chambers 17 and 17′ respectively when the piston approaches an end of barrel 11 thus preventing further exhaust of air through the chambers. The remaining air is trapped in the end of the barrel and therefore acts to cushion the piston movement at the end of the stroke, and to insure that such cushioning is effective an O-ring 57 is disposed in an annular groove in each of the cushion chambers 17 and 17′.

Considering now the provision whereby the effective axial length of the piston 49 may be adjusted to change the length of the stroke thereof, there is shown, in Figure 1, a number of small annular spacers 58 disposed coaxially on end portion 47 of the piston rod between shoulder 48 and the front cushion cylinder 56 and in a quantity sufficient to fill the space therebetween. The small spacers 58 preferably have a diameter not exceeding that of the forward portion of the piston rod 42 in order not to interfere with other components of the cylinder and the spacers are preferably thin, a thickness of one of sixteenth inch being a suitable example, inasmuch as such thickness determines the incremental change in piston travel which can be effected. To lock the spacers 58, together with the piston 49 and cushion cylinders 53 and 56, in position, a nut 59 is threaded onto the end of the piston rod 42.

With the spacer arrangement as described above, and as shown in Figure 1 in particular, the cylinder is adapted for maximum stroke travel. Travel of the piston rod 42, and thus of an attached load, is limited by abutment of the piston 49 against the heads 12 and 13 as is conventional in this form of cylinder, the rearward position of the piston rod being shown in phantom in Figure 1 and the total travel thereof being indicated by the letter A.

Referring now to Figure 2 in particular, the cylinder is shown with adjustments made for reducing the travel of the piston rod to a distance indicated by the letter B. To accomplish such adjustment, nut 59 is disengaged and the piston 49 and cushion cylinders 53 and 56 are temporarily removed. A number of the small spacers 58 having a combined thickness equal to the difference of distances A and B are then removed from the rod 42. Cushion cylinder 56 and piston 49 are then remounted on the rod 42. A number of large annular disk spacers 61 are then disposed coaxially on rod 42 immediately to the rear of the piston 49. The large spacers 61 preferably have a diameter almost equal to that of the piston 49 and preferably each is similar in thickness to the small spacers 58. The combined axial thickness of the large spacers 61 which are added to the rod 42 should be equal the combined thickness of the small spacers which were removed. Thus if all spacers 58 and 61 have the same individual thickness, the number of large spacers added will just equal the number of small spacers removed. It should be understood, however, that the spacers may be supplied with differing thicknesses so that changes in the stroke length differing from a given fixed incremental change may be made.

Following the mounting of the larger spacers 61 on the piston rod 42, rear cushion cylinder 53 is again positioned on the rod and the assembly locked in place by means of nut 59. The piston 49 is now prevented from abutting the rear head 13 owing to the presence of the larger spacers 61 and the travel of the piston rod has been reduced by a distance equal to the combined thickness of the spacers 61.

It will be understood that varying numbers of the larger spacers 61 may be employed, together with an inversely varying number of the small spacers 58, to adjust the stroke of the cylinder to a variety of values. In practice the maximum number of both the large and small spacers 58 and 61 which can be mounted on the piston rod end portions may be supplied with the cylinder to permit the user to make any adjustment called for or, alternately, a standard size cylinder may be adjusted at the factory or at a retailer's establishment to meet a customer's non-standard specifications. It will also be understood that the invention is not limited to usage in the particular form of cylinder herein described, or to fluid powered drive cylinders in general, but has application in other piston and cylinder mechanisms such as for example, free piston engines.

What is claimed is:

1. In a mechanism for adjusting the stroke length of a reciprocable piston within a cylinder, the combination comprising a piston rod disposed coaxially within said cylinder and extending from at least one end thereof, an annular piston disposed coaxially on said rod and being adjustable to a selected longitudinal position along an end portion of said rod, a plurality of annular spacers of substantially the same diameter as the piston selectably disposable on said rod in coaxial relationship therewith and in stacked relationship against one face of said piston for effectively extending the axial length thereof, means adjustable longitudinally on the rod for securing said piston and said spacers at the specified longitudinal positions on said rod, and longitudinally adjustable stop means on said rod engaging the other face of the piston.

2. In a mechanism operable within a cylinder for adjusting the travel of a piston therein, the combination comprising a reciprocable piston rod aligned longitudinally within said cylinder and having a shoulder at an intermediate point, a piston mounted on said piston rod and slidable therealong to a selected axial position thereon, a first plurality of annular spacers selectably mountable on said rod, a second plurality of spacers having a diameter substantially less than that of said piston whereby said second plurality of spacers may be mounted on said rod between said piston and said shoulder, and a fastener securable to said rod to lock said piston and said spacers thereon.

3. A mechanism for adjusting piston travel in fluid powered drive cylinders and the like, comprising, in combination, a linear piston rod having an end portion of reduced diameter thereby forming a shoulder at an intermediate point on said rod, an annular piston having a central opening conforming in diameter to said end portion of said rod, said piston being mounted on said end portion of said rod in coaxial relationship therewith and being slidable along said end portion to a selected position thereon, a first plurality of annular spacers having a central opening conforming in diameter to said end portion of said rod, a selected number of said first plurality of spacers being mountable on said end portion of said rod against said piston and having a diameter exceeding that of said remainder of said rod whereby the effective length of said piston may be increased by a selected amount, a second plurality of annular spacers having a central opening conforming in diameter to said end portion of said rod, said second plurality of spacers being mountable on said rod between said piston and said shoulder and having a diameter limited by that of said remainder of said rod whereby said second plurality of spacers do not effect the stroke of said piston, and an annular fastener securable to said end portion of said rod to lock said piston and said spacers thereon in a selected arrangement.

4. A mechanism for adjusting piston travel in fluid powered drive cylinders and the like substantially as described in claim 3 and wherein each of said first plurality of annular spacers and each of said second plurality of annular spacers is relatively thin in the axial direction with respect to the axial length of said piston whereby travel of said piston is adjustable in very small increments.

5. A piston rod assembly for a fluid powered drive cylinder, comprising a piston rod therein extending through an end of the cylinder and having a portion of reduced diameter adjoining a portion of larger diameter to thereby provide a shoulder therebetween, a piston mounted on said reduced portion of the rod and adjustable longitudinally thereon, independent spacers positioned on said reduced portion between one side of the piston and said shoulder and having an outer diameter substantially corresponding with that of the larger diameter of the piston rod, and means longitudinally adjustably positioned on said reduced rod portion at the other side of the piston for clamping the piston and spacers in position on the rod.

6. A piston rod assembly for a fluid drive cylinder, comprising a piston rod therein extending through an end of the cylinder and having a portion of reduced diameter within the cylinder adjoining a larger diameter portion to thereby provide a shoulder therebetween, a piston mounted on said reduced rod portion and adjustable longitudinally thereon, spacing means on said reduced portion removably positioned between one side of said piston and said shoulder, a plurality of independent spacers on said reduced rod portion at the other side of said piston and being of substantially the same diameter as the piston, and means adjustable longitudinally on said reduced rod portion at said other side of the piston serving to clamp the piston between said spacing means and spacers and to retain said spacing means against said shoulder.

7. A piston rod assembly for a fluid drive cylinder, comprising a piston rod therein extending through one of the ends of the cylinder, a piston mounted for longitudinal adjustment on said rod, stop means on said rod between one side of the piston and one end of the rod, spacing means removably positioned on said rod between said side of the piston and said stop means, stop means longitudinally adjustable on said rod between the other side of the piston and the other end of the rod, and a plurality of independent spacers each removably positioned on the rod between said second stop means and said other side of the piston.

References Cited in the file of this patent
UNITED STATES PATENTS

| | | |
|---|---|---|
| 1,526,244 | Shannon | Feb. 10, 1925 |
| 2,703,557 | Polki | Mar. 8, 1955 |

FOREIGN PATENTS

| | | |
|---|---|---|
| 951,123 | France | Apr. 11, 1949 |